May 25, 1954   B. WASZAK   2,679,269
JIG ARRANGEMENT FOR RECIPROCATING POWER SAWS
Filed Dec. 1, 1951
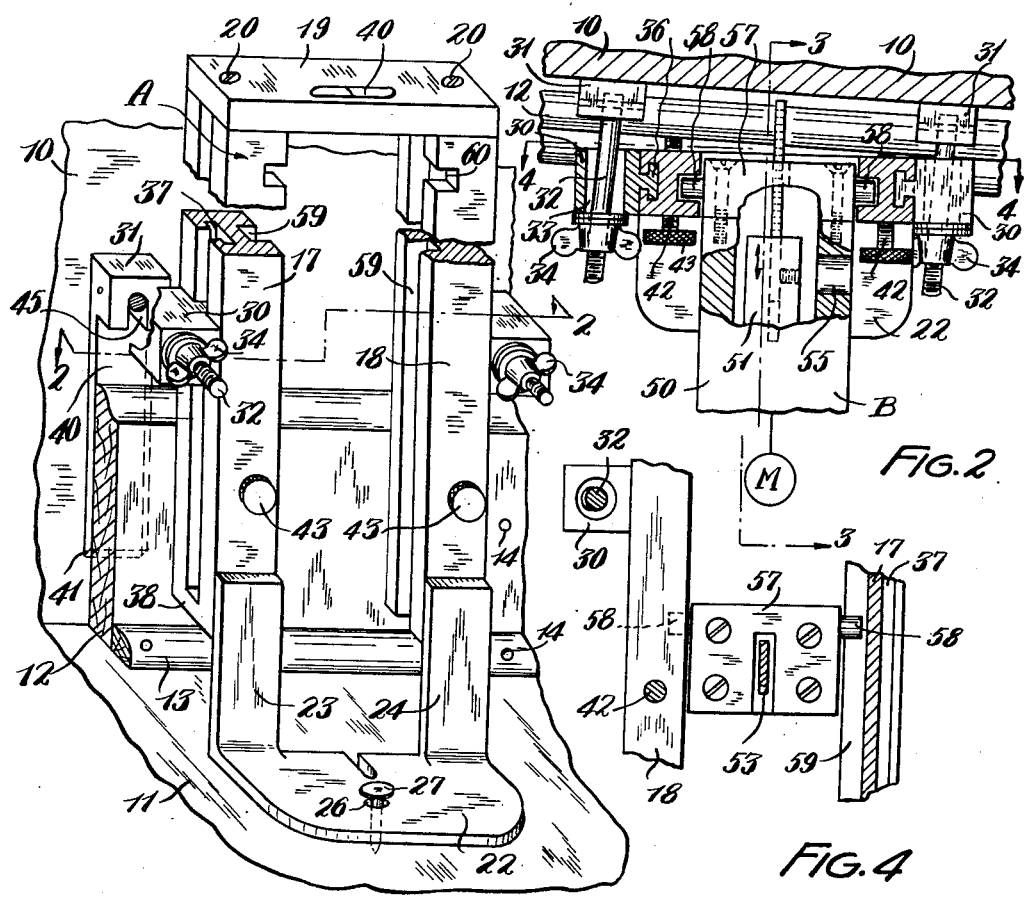
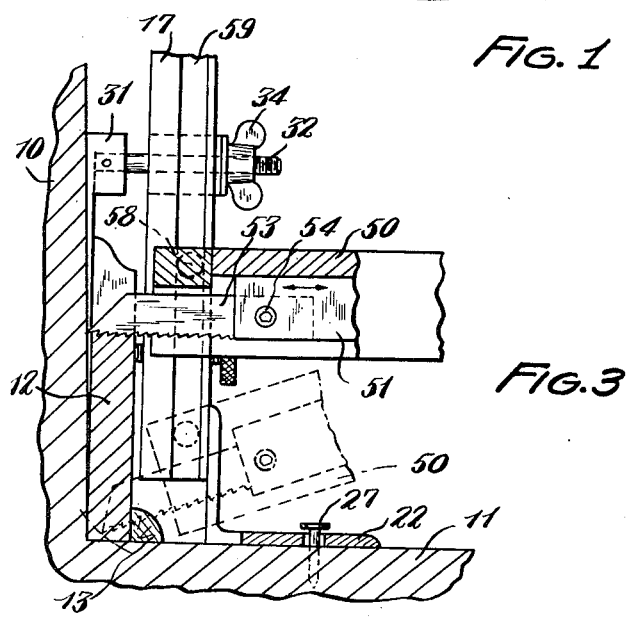
INVENTOR.
BIRNEY WASZAK.
BY
Alfred G. Body
ATTORNEY Patented May 25, 1954

2,679,269

UNITED STATES PATENT OFFICE 2,679,269

JIG ARRANGEMENT FOR RECIPROCATING POWER SAWS

Birney Waszak, Cleveland, Ohio

Application December 1, 1951, Serial No. 259,350

4 Claims. (Cl. 143—60)

This invention relates to the art of power sawing and more particularly to a combined power saw and jig or guide arrangement for sawing in places otherwise inaccessible to a saw.

The present invention is particularly adapted to cutting segments from installed baseboards of completely constructed homes for the purpose of installing various appliances, heating vents, or the like, and will be described with particular reference to such a use, although it will be appreciated that the invention is not so limited.

There are numerous way, all difficult, of removing segments from installed baseboards. One method was to remove the baseboard entirely, saw out the section to be removed, and then reinstall the cut baseboard. With this method there is always present the danger of breaking the baseboard or of damaging the plaster of the wall adjacent to the baseboard; also, when the board is removed, often nails which have been countersunk in the board and puttied over, pull out and have to be replaced which requires reputtying and repainting of the board.

Some of these difficulties can be avoided by cutting the board while in the installed position. However, a baseboard is normally flush against a finished surface and for a saw to commence cutting it is normally necessary for the blade to in some way damage the plaster immediately adjacent to the baseboard. Instead of sawing it is often conventional to drill a series of small adjacent holes in the baseboard until the board itself becomes weak enough to break away. The rough edges are then filed. This method requires an undue amount of time and it is often difficult to obtain straight smooth edges.

Portable reciprocating power saws have been employed using small short blades. Here, the frame of the tool has a front surface which is designed to abut against the board as the saw blade works its way downwardly. With such saws, the teeth of the saw blade are normally formed so as to cut on the retraction stroke of the saw blade, the purpose of this being that the cutting stroke is intended to pull the front surface of the frame of the saw into firm engagement with the surface of the baseboard. However, with the teeth so adjusted for cutting, the wood on the front surface of the baseboard tends to split, resulting in a rough edge and chipping the paint on the baseboard. Further, such portable reciprocating power saws are almost impossible to hold firmly enough so that they do not jump out of the saw cut and when the saw does jump out of the saw cut, the plaster or the baseboard is usually badly marred or chipped. Further, it is difficult to obtain a straight line cut at the desired angle relative to the surface of the baseboard.

If the saw blade were formed so as to cut on the in-stroke into the baseboard so as to eliminate this chipping difficulty, it becomes almost a superhuman effort to hold the power saw in the cut. Further, the attention of the operator to just holding the saw in the cut is so intent that it becomes almost impossible to cut the baseboard on a straight line at the desired angle.

The present invention contemplates a power saw and jig or guide arrangement which overcomes all of the above objections and enables a relatively unskilled person, including even a child, to obtain a straight line cut in a baseboard at any desired angle relative to the surface without danger of the saw jumping out of the cut and with the teeth of the saw so adjusted so as to cut on the in-stroke into the board.

In accordance with the present invention, a jig is provided in combination with a reciprocating power saw, including a reciprocating blade and housing therefor, the jig having vertical guideways formed therein in which members on the frame extend to permit free vertical and arcuate movement of the power saw in the plane of the saw blade but to otherwise always maintain the saw in fixed angular relationship relative to the jig. The jig has adjustable means for rigidly fastening it relative to the baseboard and at any desired angle. The end of the saw blade is formed to a relatively sharp angle, with the cutting edge forming one side of this angle.

The principal object of the invention is to provide a new and improved jig and saw arrangement in combination which enables a saw blade to be guided with a minimum of effort through a member situated at the intersection of two right angled surfaces wherein no clearance on the back side of the member is provided.

Another object of the invention is the provision of a new and improved jig and reciprocating type power saw in combination, the jig providing a pair of spaced vertical guide members having opposed guideways therein, between which the saw is adapted to extend with members extending into the guideways; means for adjusting the jig relative to the surface to be cut and means for rigidly clamping the jig relative to this surface.

The invention may take physical embodiment in a number of different appearing parts and combinations of parts a preferred embodiment of which will be described in detail in this specification, and illustrated in the accompanying drawing which is a part hereof and wherein:

Figure 1 is a perspective view of a jig constructed in accordance with the present invention and shown in installed position adjacent to a baseboard to be sawed.

Figure 2 is a sectional view of Figure 1, taken approximately on the line 2—2 thereof, but showing a power saw in operative relationship therewith, the angle shown between the jig and baseboard being grossly exaggerated for the purposes of illustration.

Figure 3 is a cross sectional view of Figure 2 taken approximately on the line 3—3 thereof, a second position of the saw at the end of the cutting stroke being shown in dashed lines, and Figure 4 is a fragmentary sectional view of Figure 2, taken approximately on the line 4—4 thereof.

Referring now to the drawing, wherein the embodiment shown is for the purposes of illustration only and not for the purposes of limiting the invention, Figure 1 shows a conventional wall 10 and floor 11 meeting at the usual 90° angle, with a baseboard 12 flush against the wall and at the vertex of the angle a quarter round molding 13 installed on the floor and abutting the lower outer surface of the baseboard 12.

The wall 10 may be of any conventional construction, including the usual plaster on lathing while the floor may be of the usual wood construction, either single or double thickness. The baseboard 12 and quarter round molding 13 are normally formed of wood and are held into position relative to the wall 10 and floor 11 by means of nails 14, any one of which nails may, insofar as the present invention is concerned, be located directly in the path of the saw blade of the power saw.

The construction of the wall forms no part of the present invention.

Figure 1 shows a jig A constructed in accordance with the present invention in installed position relative to the wall 10 and baseboard 12, ready to receive a power saw for the purpose of cutting the baseboard 12 and the quarter round molding 13. The jig A comprises generally a pair of spaced vertically extending members 17, 18 formed of steel or the like, and having a generally rectangular cross section. These members at the upper end are held in fixed relationship by a horizontally extending crossbar 19 secured to the upper ends of the members 17, 18 by means of screws 20 or the like. The lower ends of the members 17, 18 are held in rigid spaced relationship by means of a flat horizontal bracket member 22, having spaced upwardly extending legs 23, 24 rigidly fastened to the lower outwardly facing surfaces of the members 17, 18 respectively.

The jig A may be held in rigid fixed relationship with the baseboard by any suitable means. In the embodiment shown, however, the plate 22 has a central opening 26 through which a nail 27 is pounded into the wooden floor 11. For the purpose of further securing the jig A, relative to the baseboard 12, a pair of clamp members adjustably supported on the outer side surfaces of the members 17, 18 are provided. These clamp members comprise generally a standing member 30 and a fall member 31, held in fixed adjustable relationship by means of a bolt 32 attached to the fall member 31, and extending through an opening 33 in the standing member 30.

The fall member 31 has a long, thin downwardly extending projection terminating at its lower end in a beveled edge 41. This tongue 40 as shown in Figure 1, extends between the wall 10 and the back side of the baseboard 12 and is generally forced into this position by hammering on the top side of the fall member 31, the result being to force the baseboard 12 to spring outwardly a distance sufficient to permit the entry of the tongue 40. The upper surfaces of the standing and fall parts 30 and 31 respectively are preferably hardened so as to withstand the impact of a hammer necessary to drive the tongue between the wall 10 and the baseboard 12.

To facilitate insertion of the tongue 40 behind the baseboard 12, bolt 32 is pivoted in a vertical plane relative to the fall block 31 by means of a pin extending through the fall block 31 and the end of the bolt 32 extending into the fall block 31. For this purpose, the base of the fall block 31 facing the standing block 30 is slotted as at 45.

A wing nut 34 threaded on the bolt 32 enables the fall member 31 to be drawn tight toward the standing member 30, enough to draw the back surface of the member 17 into firm abutting engagement with the other vertical surface of the baseboard 12.

The standing member 30 has a T flange 36 extending into and slidable in a corresponding T slot 37 formed in the outer side surfaces of the members 17, 18. Thus the standing member 30 is vertically adjustable relative to the members 17, 18 so the jig A can be readily clamped to any height of baseboard 12. The horizontal member 19 closes the upper end of the slot 37, and the lower end of the slot 37 is suitably closed by an abutment 38, shown as an integral part of the member 17 but which may be a pin or other form of readily removable stop.

As shown, the horizontal cross member 19 is provided with a level 40 for the purpose of advising the person installing the jig as to when the jig is installed in a vertical or other desired angular position.

The jig A may be installed relative to the baseboard 12 in any desired horizontal angle, and for this purpose a plurality of set screws 42 having knurled handles 43 extend horizontally all the way through the members 17, 18 to the back side where they can bear against the baseboard 12. By adjusting these screws 42 to either extend beyond the back surface of the members 17, 18 or to be flush therewith, it will be seen, as shown in Figure 2, that the angular position of the jig A relative to the baseboard 12 can be readily adjusted. After this angular adjustment is made, then a clamping block is drawn up tight to rigidly fix the jig relative to the baseboard 12. It will be noted that the hole 33 has a substantially greater dimension than the bolt 32 so that the bolt may readily assume an angular position relative to the standing block 30.

The opposed facing surfaces of the members 17, 18 are spaced apart a distance to receive the head of a reciprocating power saw B. These saws are relatively conventional except for the portions to be described, and for this reason the motor M for reciprocating the saw is shown schematically. The saw illustrated comprises an outer metallic housing 50 having an internal reciprocably mounted ram 51 therein. Suitable mechanism not shown is normally provided for converting the rotary motion of the motor M to the reciprocating motion. The ram 51 has a slot in its outer end in which a thin saw blade 53 is positioned and held in this position by means of an Allen screw 54. An opening 55 in the side of the housing 50 provides access to this Allen set screw. As shown, the saw blade 53 extends beyond the end of the housing 50. This construction on power driven reciprocating saws is conventional.

In accordance with the present invention, a block 57 is mounted on the end face of the housing 50, forming an extension thereon. This block 57 has on its side a pair of laterally extending pins 58 which extend into vertical slots 59 in the inner facing sides of the members 17, 18. The slots 59 generally extend the full length of the members 17, 18. A horizontally extending slot 60 communicates slot 59 with the exterior of the jig A at the upper end of the members 17, 18. The width of the slots 59 and 60 is such as to receive the pin 58 with sufficient clearance to allow free movement of the saw B in the vertical plane of the saw blade 53 but to otherwise restrain horizontal angular movement relative to the jig A.

As shown, the outer end of the saw 53 is formed so as to have an acute angle with the toothed edge of the blade forming one side of this angle. With this construction, the saw blade 53 can commence its cutting operation at the uppermost surface of the baseboard 12 without unduly, if at all marking the plaster of the wall 10.

To install the jig A, the line on the baseboard where the sawing is to take place is first noted. The jig A is then placed generally symmetrically relative to this line and in abutting relationship with the baseboard 12. The tongues 40 are then driven between the wall 10 and the baseboard 12 so that the lower sides of the blocks 30, 31 are generally close to the upper edge of the baseboard 12. When this operation is completed, the members 17, 18 are accurately aligned relative to the desired line of cut. Screws 42 are then adjusted to provide the desired angle of cut. When this is completed, the nail 27 is hammered through the opening 26 into the floor 11. Then the wing nuts 34 are tightened up to rigidly clamp the jig A relative to the baseboard 12.

The saw blade 53 is inserted into the ram 51 such a distance that it projects beyond the end of the member 57 a distance such that it will just extend beyond the back side of the baseboard 12 when the ram 51 is in its extended position. The blade 53 is tightened into position by means of set screw 54.

The power saw B with its attached blade 53 is then positioned in the jig by guiding the pins 58 horizontally through the slot 60 and then vertically downwardly until the toothed cutting edge rests on the upper edge of baseboard 12.

When the saw blade 53 is in position, the motor M may be started and as the saw blade 53 cuts the baseboard 12, the saw B is guided downwardly in a vertical line.

When the saw B has been lowered as far as it will go because of the clearances possible, the entire saw may be rotated in a vertical plane through the cut as shown by the dotted line in Figure 3. With the arrangement shown, it is possible to substantially cut the entire baseboard 12. If necessary, the saw B can be removed from the jig and the saw blade then extended a slight distance further to cut the remaining portion of the baseboard. Ordinarily this is not necessary, however, because the small portion remaining can be easily broken away with a chisel or the like.

A perfectly clean cut through the baseboard results which is an absolute straight line and is at exactly the desired angle, either horizontal or vertical.

It will be noted that the teeth of the saw 53 can be so arranged that they will cut on the outward stroke of the ram; thus any burrs formed will be on the back side of the baseboard 12.

It will thus be seen that there has been described a practical and simple combination jig and reciprocating power saw which is extremely effective and enables the obtaining of clean saw cuts in baseboards and the like and otherwise accomplishing all of the objects of the invention.

It will be appreciated that modifications to the structure shown can be made without departing from the spirit of the invention. For example, if desired, the plate 22 can be pivoted relative to upwardly extending legs 23, 24. Alternatively likewise, different types of clamping means may be employed for holding the jig relative to the baseboard.

Having thus described my invention, I claim:

1. A jig arrangement adapted to guide a reciprocating type power saw comprising a pair of spaced vertical members; means at each end of said members holding said members in fixed spaced parallel relationship; said members having opposed surfaces in which vertical guideways are formed extend substantially the entire length of said members; said surfaces also having horizontal slots opening to the front surface members and communicating with said guideways to receive pins on the reciprocating power saw arrangement and provide access to said vertically extending slots; the remote surfaces of said members having longitudinally extending T-slots; clamping means, including a standing member having a T-portion extending into said T-slot and vertically slidable relative to said vertical member, said clamping means also including a fall member having a long, thin tongue adapted to extend between a baseboard and a wall and adjustable means extending between said standing part and said fall part.

2. A jig arrangement for guiding a reciprocating type power saw relative to a baseboard, said jig arrangement comprising in combination a pair of spaced vertically extending members, having formed in their opposed surfaces longitudinally extending guideways adapted to receive pins on a reciprocating type power saw and guide said power saw relative to said baseboard; means at each end of said members holding said members in fixed parallel relationship; the means at the lower end having a horizontally extending portion provided with means for fixing said jig relative to a floor and clamping means including a portion adapted to be forced between the baseboard and a wall for rigidly fixing said jig relative to a baseboard to be sawed.

3. The combination of claim 2 wherein adjustable means are provided extending through said vertical members and adapted to engage surfaces of the baseboard to be cut for adjusting the angle of the saw.

4. A jig arrangement for guiding a reciprocating type power saw in the sawing of a baseboard member installed at the intersection of a floor and a wall; said jig comprising a pair of spaced vertical members having vertically extending guideways formed therein; means at the bottom of said members holding said members in spaced relationship and including means for fixing said jig relative to the floor; means vertically adjustable on said members, including a portion adapted to be forced between said baseboard and said wall for clamping said vertical members in tight abutting engagement against the surface of said baseboard.

References Cited in the file of this patent

UNITED STATES PATENTS

| Number | Name | Date |
|---|---|---|
| 286,016 | Johnson | Oct. 2, 1883 |
| 1,549,818 | Torlinski | Aug. 18, 1925 |